United States Patent [19]
Rogers

[11] 3,762,536
[45] Oct. 2, 1973

[54] TUBULARIZING AND DETUBULARIZING BELT SYSTEM

[75] Inventor: Alan Fletcher Rogers, Naperville, Ill.

[73] Assignee: Union Carbide Corporation, New York, N.Y.

[22] Filed: Mar. 30, 1972

[21] Appl. No.: 239,417

[52] U.S. Cl. .............................................. 198/184
[51] Int. Cl. ........................................... B65g 15/08
[58] Field of Search .................. 198/184, 193, 194, 198/DIG. 2

[56] References Cited
UNITED STATES PATENTS

| | | |
|---|---|---|
| 572,262 | 12/1896 | Kennel ............................ 198/194 X |
| 2,119,910 | 6/1938 | Ferry ............................... 198/194 X |
| 3,338,383 | 8/1967 | Hashimoto ........................... 198/184 |
| 3,661,244 | 5/1972 | Koyama ............................... 198/184 |

Primary Examiner—Edward A. Sroka
Attorney—Paul A. Rose et al.

[57] ABSTRACT

In a moving belt system wherein the belt is tubularized and detubularized stresses and strains during tubularization and detubularization are minimized by passing the belt immediately before tubularization and after detubularization over a flat roller which is elevated a predetermined distance above the plane tangential to the bottom of the tubularized portion of the belt.

25 Claims, 12 Drawing Figures

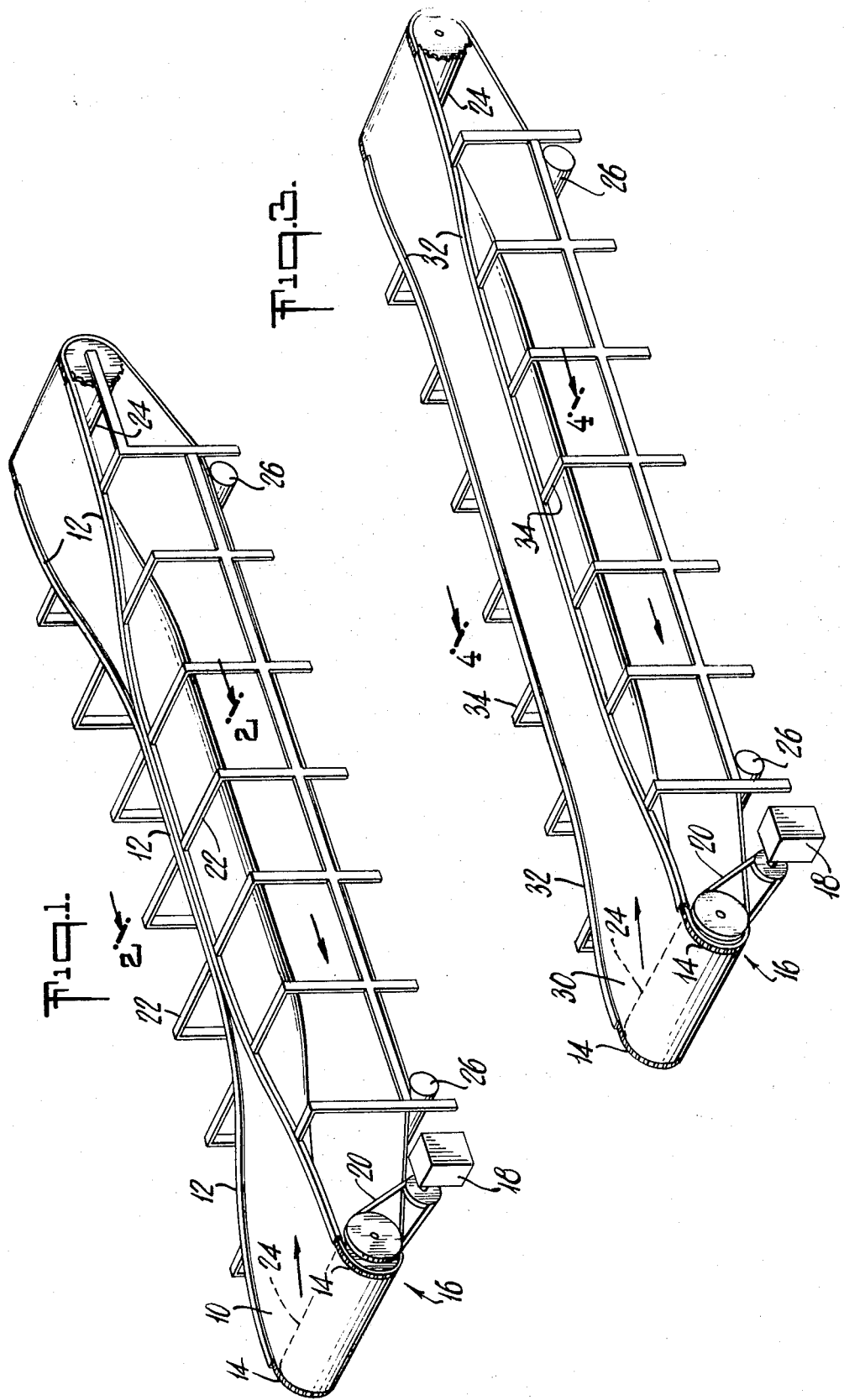

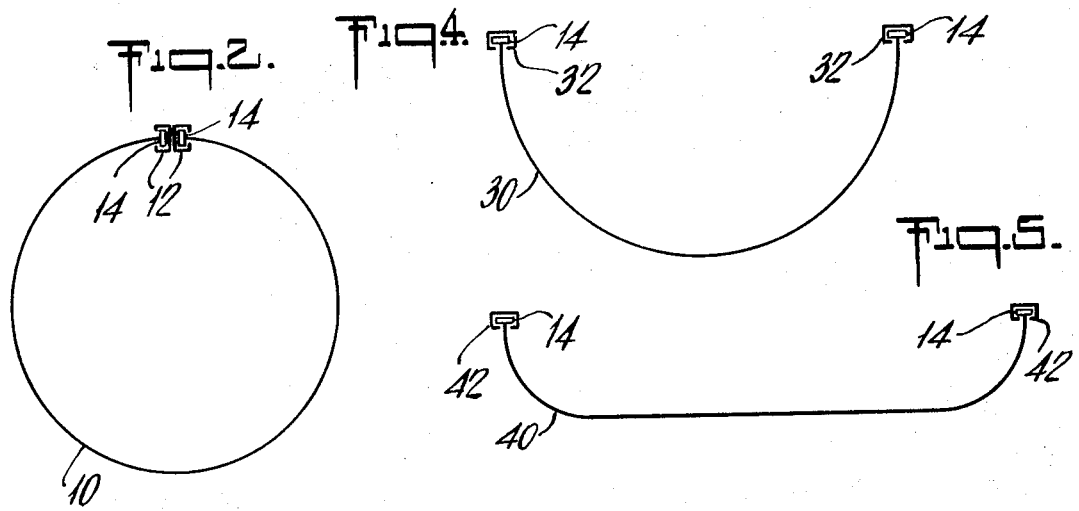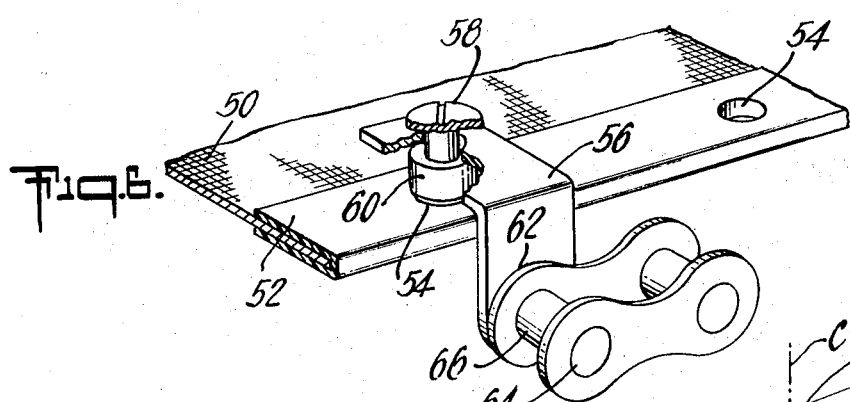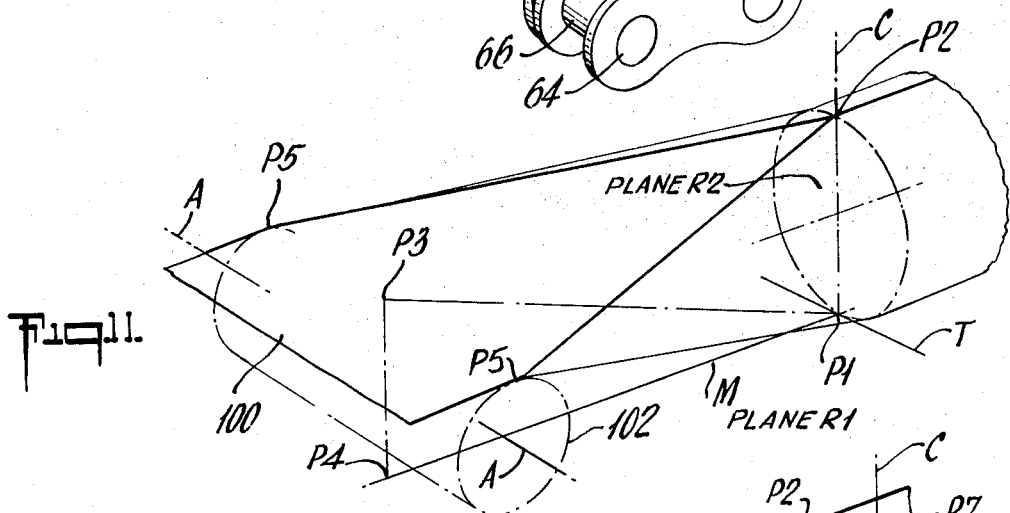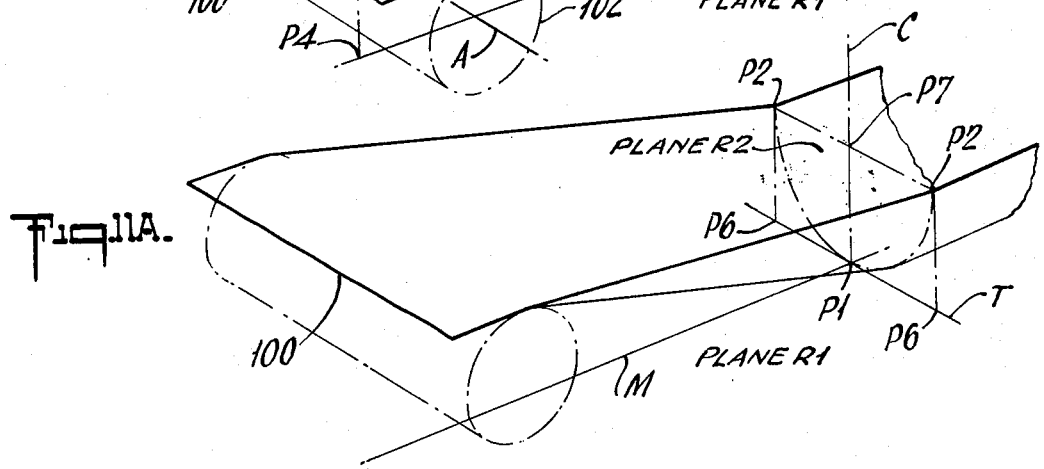

PATENTED OCT 2 1973 3,762,536

TUBULARIZING AND DETUBULARIZING BELT SYSTEM

Many industrial processes require a moving flexible belt which can be twisted and shaped into desired configurations and restored to its original shape without damage to the belt or alteration of its physical structure. This frequently is the case with the conveyor belts which must have an at least semitubular cross-sectional profile such as to contain the material being transported. These belts are often made of a more or less elastic material, one which is capable of limited distortion and flexing. Such elastic materials cannot be used for belts in all applications, however, because they store energy when flexed. For this reason, unless they are maintained under high tensile forces their shape or contour may change from what is desired. Thus many applications require belts made of woven mesh or the like. The most convenient manner of using woven mesh material in a belt would be to use a strip as it was loomed, that is, with the wrap strands parallel to the direction of movement or travel of the belt and the weft strands at right angles to the direction of travel. Such use of wire mesh in the belt systems presently available, however, is limited to those systems where the belt is flat throughout its path of travel and return, with no tubularization or bending up of the edges of the belt.

In commonly employed belt systems wherein the belt is partially tubularized or at least has the edges bent up to contain the material being transported, the attendant stresses on and distortions of the belt would quickly deform and soon destroy an ordinary woven mesh belt. One current solution to this problem is to use what is known as a "bias-woven" belt, that is, a belt in which the warp and weft threads of the mesh are at an angle, usually about 45°, with the edge of the belt. In wider belts this can be done by cutting a segment of the mesh at a 45° angle across the warp threads and then splicing pieces together to make the belt. This necessity for multiple splicing adds greatly to the cost of the belt and provides areas of possible weakness and future rupture.

I have now developed a method and apparatus for tubularizing and detubularizing a continuous moving belt which results in minimum strain and distortion of the belt and thus avoids permanent deformation of the belt material. My invention uses ordinary flat rollers for belt return and permits the use of various belt materials. Woven mesh belting can be used as loomed, without the necessity for cutting and splicing it to achieve a bias woven belt. My invention is useful and beneficial in any belt system where the belt serves as a support for particulate materials, whether or not they are distributed uniformly across the belt width.

In the drawing:

FIG. 1 illustrates a tubularizing and detubularizing belt system wherein the belt is fully tubularized.

FIG. 2 is a cross-section view of the fully tubularized portion of the belt of FIG. 1.

FIG. 3 illustrates a tubularizing and detubularizing belt system wherein the belt is only partially tubular when subjected to maximum tubularization.

FIG. 4 is a cross-section view of a partially tubularized belt with a curved mid line area, taken at maximum tubularization in FIG. 3.

FIG. 5 is a cross-section view of a partially tubularized belt with a flat mid line area, shown at maximum tubularization.

FIG. 6 is a detail view of a belt edge guide assembly.

FIG. 11 is a diagramatic representation of the spatial relationships of the elements of the belt system of the invention, as in FIG. 11 A.

Figure 7:
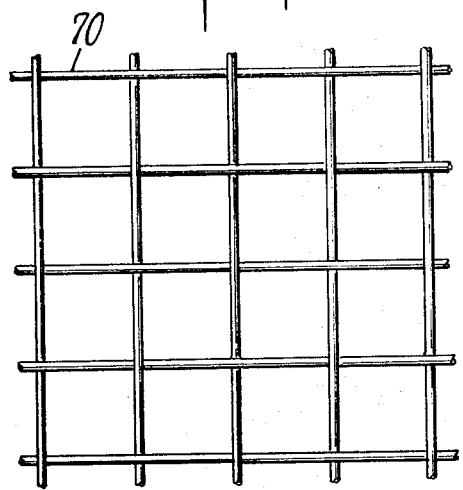
FIG. 7 illustrates a square weave mesh for a belt.

In FIG. 1 a continuous belt 10 is guided into and out of a fully tubular configuration by track 12 which engage chains 14 attached to the edges of the belt 10. Spur gears 16 engage the chains 14 and thus drive the belt 10, being powered by a motor 18 through a drive belt 20. The track 12 is supported by braces 22. At each end of the machine the belt 10 passes over an elevated roller 24 which may rotate freely or be driven by being connected to the spur gears 16. In the lower portion of the machine the flat belt 10 passes over idler rolls 26. The elevated rollers 24 are positioned according to the principles described below with respect to FIG. 11 and as a result stresses are minimized in the belt 10 as it passes from the flat state to the fully tubular state and back again. FIG. 2 shows a cross section through the fully tubularized portion of the belt showing the almost fully circular configuration of the belt 10.

In FIG. 3 the moving belt system is similar to that of FIG. 1, however the belt is only partially tubularized in the area of maximum tubularization. A continuous belt 30 is guided into and out of a partially tubular configuration by tracks 32 which engage chains 14 attached to the edges of the belt 30. Spur gears 16 engage the chains 14 and thus drive the belt 30, being powered by a motor 18 through a drive belt 20. The track 32 is supported by braces 34. At each end of the machine the belt 30 passes over an elevated roller 24 which may rotate freely or be driven by being connected to the spur gears 16. In the lower portion of the machine the flat belt 30 passes over idler rolls 26. The elevated rollers 24 are, as in the case of the fully tubularized belt, positioned according to the principles described below in connection with FIG. 11. Thus positioned the rollers minimize stress in the belt as it passes from the flat state to the partially tubular state and back again. FIG. 4 shows a cross-section through the partially tubularized portion of the belt of FIG. 2 showing the partially circular configuration of the belt during maximum tubularization. FIG. 5 shows a different embodiment, being a cross-sectional view of a partially tubularized belt 40 with a flat bottom in the partially tubularized portions, as contoured by tracks 42 but otherwise similar to the belt and belt system shown in FIGS. 3 and 4.

In FIG. 6 can be seen a detail view of a method of attaching the edge of the belt to guide and drive means. In this embodiment the edge of the belt 50 is reinforced with a flexible reinforcing strip 52 which is glued, crimped, soldered or otherwise attached to the belt. Holes 54 are punched through the strip 52 and belt 50 at regular intervals along the edge of the belt. Angle brackets 56 are attached at one end to the reinforced edge strip 52 by rivets 58 with spacing washers 60 between the bracket 56 and the strip 52. The other end of the bracket 56 is attached to the inner chain link side plate 62 by a rivet 64 extending through the chain link spacer 66. With the belt attached to the chain in this manner the belt can be both driven and guided by movement of the chain.

Figure 8:
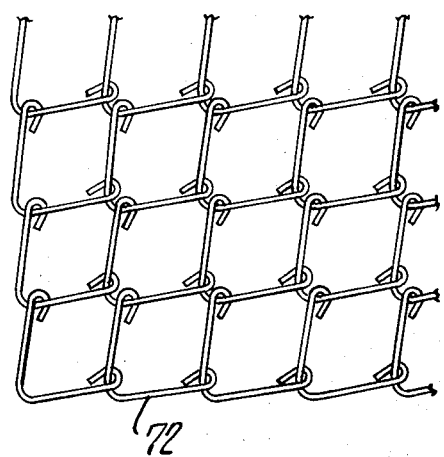
FIG. 8 illustrates a double articulating wire link mesh for a belt.

The invention can be applied to any flexible, relatively inelastic belt, regardless of the material of which it is made or the manner in which is is constructed. Thus the belt may be a woven mesh 70, as shown in FIG. 7, or a non-woven mat, with mesh strands of any suitable non-elastic material including metals such as copper, steel, aluminum or the like, as well as natural and synthetic fibers such as glass, polyester, graphite, nylon and the like. The mesh of double articulated link 72 shown in FIG. 8 can be a metallic wire such as copper, steel, aluminum or the like or any other suitable non-elastic material including molded or extruded plastic such as polyester, nylon, polypropylene or the like.

Figure 9:
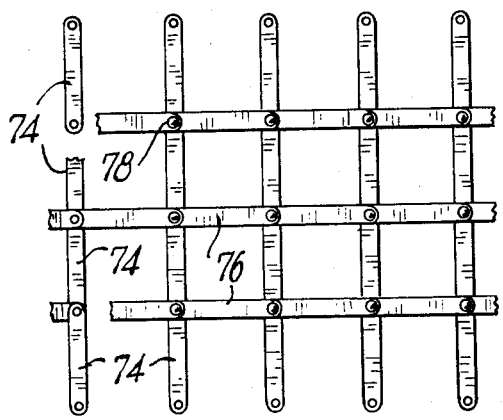
FIG. 9 illustrates a pinned link mesh for a belt.
Figure 10:
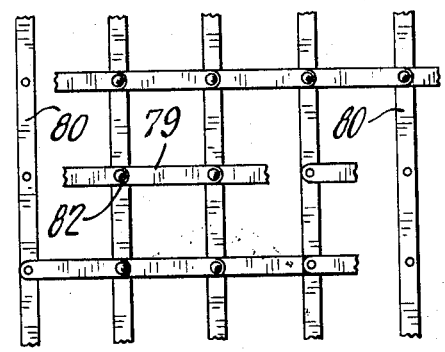
FIG. 10 illustrates a cross-linked continuous strand mesh for a belt.

Another suitable belt material is the pinned link mesh of FIG. 9 in which individual warp links 74 and weft links 76 are secured by rivets 78. These links can be metal such as copper, bronze, steel, aluminum or the like, as well as plastic such as polyethylene, polypropylene, polyester, nylon or the like, leather or any other suitable non-elastic material. These same materials are suitable for the cross-linked continuous strand mesh of FIG. 10 in which individual weft links 78 connect continuous warp strands 80 through rivets 82.

The drive means utilized can be any convenient system of moving the belt. In the case of belts of moderate width and weight the driving force can be applied to the edges of the belt alone. With particularly wide and/or heavy belts additional moving force can be applied at other points across the width of the belt, usually at the center. Thus a belt can be readily driven and guided at the same time by fastening a chain to the edges of the belt as shown in FIG. 6 and driving the chain with sprocket gears as shown in FIG. 1 while running the chain through guide tracks as shown in FIG. 1. Additional driven chain, such as a center chain can also be employed. It is however within the scope of the invention to supply a driving force to the belt in other ways as by driving a flat roller with a surface which would frictionally engage the belt. And of course guide means for the edge of the belt would not have to be a belt but could be any guide member capable of being guided by a track or the like.

In FIG. 11 which illustrates the case of full tubularization, the basic plane of reference R1 is defined by line M, which is the extension of the midline of the tubularized portion of the belt 100, and the line T intersecting line M at a right angle at point P1, which line T is tangential to the midline area of the belt 100 at the point of initial most complete tubularization of said belt 100. The line C, which is a centerline of the most fully circular cross-sectional area of the tubularized belt, intersects point P1 and is perpendicular to the plane R1. Lines C and T define the plane R2 which is the plane of initial most complete tubularization of the belt 100 and of the most fully circular cross-sectional area of the tubularized belt. In the diagramatic representation of FIG. 11 the point P2 in the plane R2 is the theoretical point of initial divergence of the edges of the belt 100 from the tubular configuration toward the flat configuration. In the fully tubular case illustrated there is only a single point P2 because the edges of the belt come together at the point of complete tubularization. Whenever the most complete tubularization results in less than a perfect tube, as in all partial tubularization cases, there are two points P2, one for each edge of the belt and both in plane R2, as shown in FIG. 11A.

The roller 102 over which the belt 100 is flattened is so positioned that its axis A is parallel to plane R1 and also to plane R2. A line from the mid point P3 of the top surface of the belt 100 in contact with the roller 102 perpendicular to plane R1 intersects plane R1 at point P4. The edges of the belt 100 resting on the roller 102 are designated P5. The position of the roller is defined by its distance P1–P4 from plane R2 and its height P3–P4 above plane R1.

According to the invention, for any distance P1/P4 the height P3/P4 is adjusted so that the distance P5/P2 along the edges of the belt from the top of the roller 102 to the point of most complete tubularization is substantially equal to the distance P3/P1 from the mid point of the flattened belt 100 on top of the roller 102 along the midline of the belt 100 to the nearest point of most complete tubularization of the belt. In the case of a fully tubularized belt the height P3/P4 can be stated mathematically as a function of the diameter P1/P2 of the tubularized belt. This function can be stated:

$$P3/P4 = K \cdot P1/P2$$

The theoretical value for the constant K is 1.73 which represents the ideal position of the roller 102 in a fully tubularized belt system. In practice, benefits of the invention can be achieved to an appreciable degree with a value for K as low as 1.0 or as high as 2.5.

The distance P4/P1 of the roller 102 away from the point of complete tubularization is not nearly as critical as its height P3/P4. This distance P4/P1 can be varied within relatively wide limits to accommodate practical problems in the design and construction of the equipment and the properites of the particular belt material used. In general, the distance P4/P1 should be from 6 to 24 times the diameter P1/P2, with P4/P1 preferably equal to about 12 P1/P2.

A more general formula governs the position of the roller in a belt system where the belt is only partially tubularized in the region of most complete tubularization. FIG. 11A, which is a modification of FIG. 11 in the area of tubularization, shows the spacial configuration in this more general case. Because the belt is only partially tubularized there are two separated points P2, each an equal distance P2/P7 from a point P7 on the centerline C, measured along the line P2/P7 parallel to line T. Each edge of the belt P2 is elevated above the reference plane R1 a distance P2/P6 measured along the line P2/P6 perpendicular to the plane R1 from P2 to the point P6 on line T.

For the generalized case which includes all degrees of most complete tubularization from the partial tubularization of FIGS. 4 and 5 to the full tubularization of FIG. 2, the optimum height P3/P4 of the top of the roller 102 above the reference plane R1 can be determined by the following formula which uses the relationships diagrammed in FIGS. 11 and 11A:

$$P3/P4 = (P2/P6/2) + (1/2 \cdot P2/P6)(P3/P5 - P2/P7)^2$$

As discussed above, in the special case of fully tubularized belt this reduces to the simple formula $$P3/P4 = 1.73 \, P1/P2$$

A machine of the type shown in FIG. 1 was designed to tubularize a flat belt to a diameter of 24 inches over a distance of 24 feet. To the edges of the belt were attached flexible roller chains capable of limited bending and twisting in all directions. These roller chains were guided in rigid accurately aligned control tracks. The theoretical width of the belt was 24 inches, but this was reduced by 2¼ inches to allow for chain guide space at the top of the machine where the belt would be completely tubularized.

The tubularizing and detubularizing mode was defined by two criteria:

1. The length of the center strand path was made as nearly equal as possible to the length of the edge strand path by elevating the end roller to the height defined by $$P3/P4 = 1.73 P1/P2$$

2. The horizontal distance from the point of initial full tubularization to the top of the end roller was approximately 12 times the diameter of the tubular portion.

The belt material was a twill woven phosphor bronze wire of 44 × 26 count, having an open area of 26 percent. The belt was woven with a very low crimp in the cross direction and a high crimp in the machine, or travel, direction. It is then relatively sleazy, allowing strands to rotate somewhat at crossover points. The belt material was tested in an Instron Testing Machine, and it was found that permanent elongations occurred at one-half percent elongation in a single cycle, and at one-fourth percent elongation after 10 cycles.

Flat rollers somewhat less in width than the width of the belt and 25.471 inches in diameter were mounted at both ends of the machine, Sprockets with a chain pitch diameter of 25.471 inches were used at the outside ends of the pulleys. Free wheeling idler rollers were placed at intervals along the return path of the belt at the bottom of the machine.

The belt assumed a smooth configuration throughout the tubularizing and detubularizing cycles mode when the edge path was straight in all but its terminal portions and the angles of the chain guide tracks were adjusted to conform to the drape of the belt. The belt ran smoothly under power and showed no signs of deterioration after more than one hundred hours of running.

What is claimed is:

1. A moving belt tubularizing-detubularizing mechanism comprising a continuous belt which is substantially inelastic and is susceptible to only limited distortion and flexing, drive means engaging said belt and capable of moving it through an entire tubularization-detubularization cycle, belt edge guide means controlling said belt along lines parallel with and proximate with or coincident with the edges of said belt, rollers positioned under said belt at the points of initial total detubularization or flattening of said belt, the axes of said rollers being parallel with both the plane of the most fully circular cross-sectional area of the tubularized belt and the plane tangential to or coincident with the midline of the tubularized portion of said belt, said roller axes being displaced a predetermined distance above said tangential/coincident plane, measured along a line perpendicular to said plane, such that the distances from each end of the top surface of each of said rollers along the edges of said belt to the closest point of most complete tubularization of the belt is substantially equal to the distance from the center of the top surface of said roller along the midline of said belt to the closest point of most complete tubularization of said belt.

2. A moving belt mechanism according to claim 1 wherein said belt comprises a woven mesh.

3. A moving belt mechanism according to claim 2 wherein said mesh has warp strands running lengthwise of said belt and weft strands running across said belt.

4. A moving belt mechanism according to claim 2 wherein said mesh has warp and weft strands on the bias of the length of said belt.

5. A moving belt mechanism according to claim 2 wherein said mesh is woven of metal strands.

6. A moving belt mechanism according to claim 5 wherein said mesh is woven of copper alloy strands.

7. A moving belt mechanism according to claim 2 wherein said mesh is woven of plastic strands.

8. A moving belt mechanism according to claim 7 wherein said mesh is woven of polyester strands.

9. A moving belt mechanism according to claim 1 wherein said belt comprises a double articulating wire link mesh.

10. A moving belt system according to claim 1 wherein said belt is a non-woven web.

11. A moving belt mechanism according to claim 1 wherein said belt comprises a pinned link mesh.

12. A moving belt mechanism according to claim 1 wherein said drive means comprises driven gears positively engaging said belt along lines parallel and proximate with or coincident with the edges of said belt.

13. A moving belt mechanism according to claim 12 wherein said driven gears engage apertured strips attached to said belt along lines parallel and proximate with or coincident with the edges of said belt.

14. A moving belt mechanism according to claim 13 wherein said apertured strips are chains.

15. A moving belt mechanism according to claim 14 wherein said chains are attached to the edges of said belt.

16. A moving belt mechanism according to claim 14 wherein said chains are attached to said belt along lines parallel and proximate with but not coincident with the edges of said belt.

17. A moving belt mechanism according to claim 1 wherein said belt edge guide means comprises guide tracks engaging guides attached to said belt along lines parallel and proximate with or coincident with the edges of said belt to guide the edge areas of said belt along predetermined paths.

18. A moving belt mechanism according to claim 17 wherein said guide tracks engage chains attached to said strip along lines parallel and proximate with or coincident with the edges of said belt.

19. A moving belt mechanism according to claim 18 wherein said chains are attached to the edges of said belt.

20. A moving belt mechanism according to claim 18 wherein said chains are attached to said belt along lines parallel and proximate with but not coincident with the edges of said belt.

21. A moving belt mechanism according to claim 17 wherein said guide tracks are so shaped as to change said belt from a relatively flat configuration to a partially tubular configuration, maintain said belt in said partially tubular configuration for a predetermined distance and then change said belt back to a relatively flat configuration.

22. A moving belt mechanism according to claim 17 wherein said guide tracks are so shaped as to change said belt from a relatively flat configuration to a fully tubular configuration, maintain said belt in said tubular configuration for a predetermined distance and then change said belt back to a relatively flat configuration.

23. In the method of interchanging the shape of a moving belt between a flat configuration and an at least partially tubular configuration, the improvement which comprises displacing the cross-sectional line of initial total flatness of the belt a predetermined distance from the plane tangential to or coincident with the midline area of the tubularized portion of said belt, measured along a line from said line of initial total flatness perpendicular to said tangential/coincident plane, while maintaining said line of initial total flatness parallel to said tangential/coincident plane and perpendicular to a line extending from the midpont of said line of initial total flatness to the midline of the tubularized portion of said belt at the initial point of maximum tubularization, said predetermined distance being such that the distances from each end of said line of initial total flatness along the edges of said belt to the closest point of most complete tubularization of the belt is substantially equal to the distance from the center of said line of initial total flatness along the midline of said belt to the closest point of most complete tubularization of said belt.

24. In the method of interchanging the shape of a moving belt between a flat configuration and a partially tubular configuration, the improvement which comprises displacing the cross-sectional line of initial total flatness of the belt a predetermined distance from the plane tangential to or coincident with the midline area of the tubularized portion of said belt, measured along a line from said line of initial total flatness perpendicular to said tangential/coincident plane, while maintaining said line of initial total flatness parallel to said tangential/coincident plane and perpendicular to a line extending from the midpoint of said line of initial total flatness to the midline of the partially tubularized portion of said belt at the initial point of maximum tubularization, said predetermined distance being such that the distances from each end of said line of initial total flatness along the edges of said belt to the closest point of most complete tubularization of the belt is substantially equal to the distance from the center of said line of initial total flatness along the midline of said belt to the closest point of most complete tubularization of said belt.

25. In the method of interchanging the shape of a moving belt between a flat configuration and fully tubular configuration, the improvement which comprises displacing the cross-sectional line of initial total flatness of the belt a predetermined distance from the plane tangential to the midline area of the tubularized portion of said belt, measured along a line from said line of initial total flatness perpendicular to said tangential plane, while maintaining said line of initial total flatness parallel to said tangential plane and perpendicular to a line extending from the midpoint of said line of initial total flatness to the midline of the tubularized portion of said belt at the initial point of full tubularization, said predetermined distance being such that the distances from each end of said line of initial total flatness along the edges of said belt to the closest point of full tubularization of the belt is substantially equal to the distance from the center of said line of initial total flatness along the midline of said belt to the closest point of full tubularization of said belt.

* * * * *